United States Patent
Tsirkin et al.

(10) Patent No.: US 10,423,478 B2
(45) Date of Patent: Sep. 24, 2019

(54) SECURITY ENHANCED OUT OF PROCESS USER SPACE HANDLING OF HARDWARE EVENTS

(71) Applicant: Red Hat, Inc., Raleigh, NC (US)

(72) Inventors: Michael Tsirkin, Lexington, MA (US); Andrea Arcangeli, Imola (IT); David Alan Gilbert, Manchester (GB)

(73) Assignee: Red Hat, Inc., Raleigh, NC (US)

( * ) Notice: Subject to any disclaimer, the term of this patent is extended or adjusted under 35 U.S.C. 154(b) by 198 days.

(21) Appl. No.: 15/689,341

(22) Filed: Aug. 29, 2017

(65) Prior Publication Data

US 2019/0065301 A1 Feb. 28, 2019

(51) Int. Cl.
*G06F 11/07* (2006.01)
*G06F 21/70* (2013.01)
*G06F 21/57* (2013.01)

(52) U.S. Cl.
CPC ...... *G06F 11/0766* (2013.01); *G06F 11/0706* (2013.01); *G06F 21/57* (2013.01); *G06F 21/70* (2013.01); *G06F 2212/1052* (2013.01)

(58) Field of Classification Search
CPC ... G06F 11/0766; G06F 11/0706; G06F 21/57
USPC .......................................................... 714/48
See application file for complete search history.

(56) References Cited

U.S. PATENT DOCUMENTS

| | | | | |
|---|---|---|---|---|
| 5,729,710 A | * | 3/1998 | Magee | G06F 9/544 711/203 |
| 7,047,520 B2 | * | 5/2006 | Moore | G06F 11/362 710/266 |
| 8,341,627 B2 | * | 12/2012 | Mohinder | G06F 12/145 718/1 |
| 9,069,658 B2 | * | 6/2015 | Borchers | G06F 12/0246 |
| 9,229,881 B2 | | 1/2016 | Epstein | |
| 9,424,114 B2 | | 8/2016 | Horman | |
| 2004/0160446 A1 | * | 8/2004 | Gosalia | G06F 9/4843 345/503 |
| 2015/0106572 A1 | | 4/2015 | Stone et al. | |
| 2016/0378677 A1 | | 12/2016 | Castelino et al. | |

OTHER PUBLICATIONS

Corbet, Jonathan, "Page Faults in User Space: MADV_USERFAULT, remap_anon_range(), and userfaultfd()", https://lwn.net/Articles/615086/, 4 pages.

(Continued)

*Primary Examiner* — Jason B Bryan
*Assistant Examiner* — Indranil Chowdhury
(74) *Attorney, Agent, or Firm* — Lowenstein Sandler LLP

(57) ABSTRACT

Systems and methods that enable user space processing threads to handle hardware events (e.g., page faults) for another processing thread in a security-enhanced manner. An example method may comprise: associating, by a processing device executing a kernel, a first processing thread with a storage unit of a second processing thread; detecting, by a processing device, a hardware event corresponding to an address of the storage unit; determining a storage object comprising data of the storage unit; translating the address of the storage unit to an offset of the storage object; and transmitting, by the kernel, a notification of the hardware event to the first processing thread, wherein the notification comprises the offset.

20 Claims, 6 Drawing Sheets

(56) References Cited

OTHER PUBLICATIONS

Tuulos, Ville, "Querying Data in Amazon S3 Directly with User-Space Page Fault Handling", Head of Data at AdRoll, http://tech.adroll.com/blog/data/2016/11/29/traildb-mmap-s3.html, Nov. 29, 2016, 13 pages.

Kashyap, Sanidhya et al., "Instant OS Updates via Userspace Checkpoint-and-Restart", Georgia Institute of Technology; CRIU and Odin, Inc., https://sslab.gtisc.gatech.edu/assets/papers/2016/kashyap:kup.pdf, Jun. 22-24, 2016, 16 pages.

* cited by examiner

SECURITY ENHANCED OUT OF PROCESS USER SPACE HANDLING OF HARDWARE EVENTS

TECHNICAL FIELD

The present disclosure is generally related to data storage management, and more particularly, to virtualized memory management technology that enables a user space process to handle hardware events (e.g., page faults) for another process in a security-enhanced manner.

BACKGROUND

Modern computer systems often include storage virtualization to enhance access to data stored on one or more data storage devices. A common example of storage virtualization is memory virtualization (e.g., virtual memory). Memory virtualization is a data storage technique that maps physical addresses of a memory device to virtual addresses for use by applications. Memory virtualization may hide storage fragmentation of an underlying memory device and may make it appear to user space applications that there is more physical memory available then is physically present on a computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
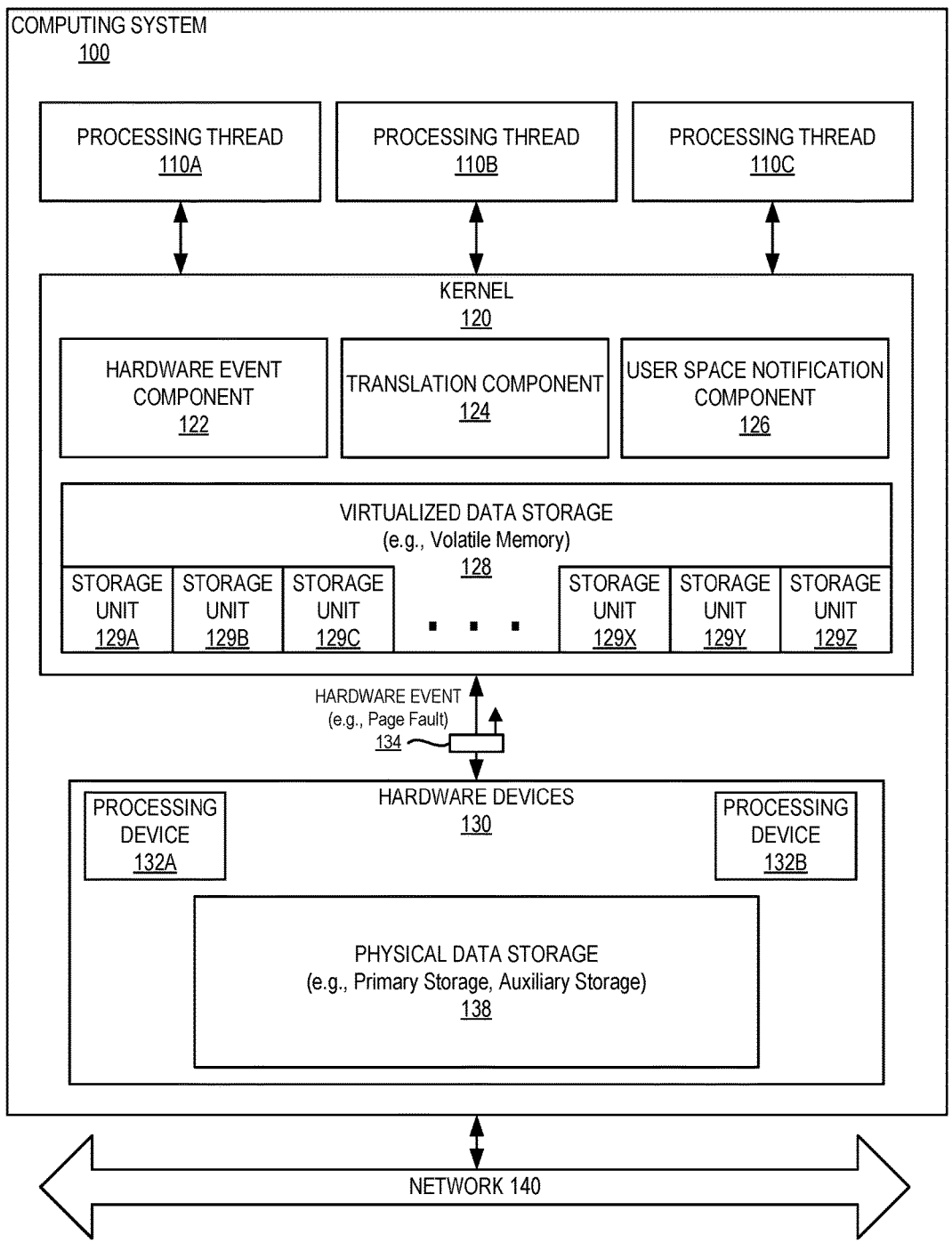
FIG. 1 depicts a high-level block diagram of an example computer system architecture that enables a user space processing thread to handle hardware events encountered by a different processing thread, in accordance with one or more aspects of the present disclosure.

Modern computer systems often include memory virtualization features that contain security enhancements to reduce the computer systems' vulnerability to attack. An example of a security enhancement may involve altering the address space layout shared by processing threads. The alteration may reduce the ability of an attacker to compromise a processing thread by strategically replacing executable code within the address space because the executable code may no longer be at the typical location within the address space. Other security enhancements may involve altering the virtual addresses shared across processing threads by introducing a random base address so that addresses intercepted by another processes are obfuscated from the actual address being referenced.

Memory virtualization details are often implemented by features of a kernel and may be hidden from a processing thread executing in user space. For example, a user space processing thread may be assigned a range of virtual memory that appears to be accessible but only a portion of the range may be loaded into physical memory at any point in time. When the user application requests access to a portion of virtual memory that is not present in physical memory, the underlying hardware may generate a hardware event (e.g., page fault). The kernel may detect the hardware event and handle the hardware event by retrieving (e.g., paging) the requested portion of virtual memory from a cache in a secondary storage device (e.g., swap space of a hard disk). The process of detecting the hardware events and retrieving the data corresponding to the portion of virtual memory is often handled by the kernel and is typically hidden from other user space processing threads. Exposing the existence of hardware events to other processing threads may enhance the functionality of a computer system but may adversely affect the security enhancements to the memory virtualization. The adverse effect on security may occur because the hardware events may reference actual virtual addresses and this may defeat any address randomization or masking techniques in place.

Aspects of the present disclosure address the above and other deficiencies by providing technology to share hardware event information across different processing threads without exposing the virtual addresses. In one example, executable code of a kernel or other module may associate a processing thread (e.g., event handling process) with a storage unit in use by one or more other processing threads (e.g., event initiating processes). The storage unit may be any portion of data storage space and in one example may be a memory page within a portion of virtual memory assigned to the one or more processing threads. The kernel may detect a hardware event that corresponds to the storage unit. The hardware event may be a page fault, exception, or other hardware initiated signal associated with the storage unit. The hardware event may identify the virtual address of the storage unit and the kernel may translate the virtual address to an offset. The offset may be a displacement value that identifies the same location in memory as the virtual address but is relative to a storage object. The storage object may be a memory-mapped file or shared kernel object that functions as a backing store for the storage unit. The kernel may transmit a notification to the event handling process and the notification may include the offset without including any corresponding virtual addresses.

The systems and methods described herein include technology that enhances the functionality and security of storage virtualization (e.g., memory virtualization). In particular, aspects of the present disclosure may enable a first processing thread to listen to storage based hardware events that originate from actions of a second processing thread. This may enable the first processing thread to handle hardware events as opposed to relying on the kernel to handle the hardware events. This may be advantageous when the hardware events are page faults because it may enable a user space process or virtual machine processes to detect which storage units are being accessed or modified by other processing threads. This may enable the listening processing thread to detect memory alterations of the other processing threads and to track the alternations for memory migration, optimization, or checkpoint purposes.

Various aspects of the above referenced methods and systems are described in details herein below by way of examples, rather than by way of limitation. The examples provided below discuss a virtualized computer system where the processing threads may be managed by aspects of a hypervisor, a host operating system, a virtual machine, or a combination thereof. In other examples, the processing thread may be performed in a computer system that is absent a hypervisor or other hardware virtualization features (e.g., virtual machines) discussed below.

FIG. 1 depicts an illustrative architecture of elements of a computing system 100, in accordance with an embodiment of the present disclosure. Computing system 100 may include processing threads 110A-C, a kernel 120, hardware devices 130, and a network 140. It should be noted that other architectures for computing system 100 are possible, and that the implementations of the computing system utilizing embodiments of the disclosure are not necessarily limited to the specific architecture depicted.

Computing system 100 may be a single computing machine or multiple computing machines arranged in a homogenous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may execute one or more processing threads 110A-C and a kernel 120.

Each of the processing threads 110A-C may include a sequence of instructions that can be executed by one or more processing devices. A processing thread may be managed by kernel 120 or may be a part of kernel 120. For example, kernel 120 may execute as one or more processing threads that cooperate to manage resource access by processing threads 110A-C. A processing thread may be a thread, a process, other stream of executable instructions, or a combination thereof. A thread may any computer based "thread of execution" and may be the smallest sequence of programmed instructions managed by a kernel 120. A process may include one or more threads and may be an instance of an executable computer program.

Processing threads 110A-C may include processing threads that are related to each other and processing threads that are unrelated to each other. A processing thread may be related to another when it is created based on an existing processing thread and includes a reference (e.g., link) to an existing processing thread and a copy of computing resources of the existing processing thread. This may occur when a child processing thread is created (e.g., forked) from a parent processing thread. A processing thread may be unrelated to another processing thread if it is created without a copy or reference to the preexisting processing thread.

Processing threads 110A-C may be associated with a particular level of privilege and each of the processing threads 110A-C may have a similar level of privilege or they may have different levels of privilege. The privilege levels of a processing thread may be the same or similar to protection levels (e.g., processor protection rings) and may indicate an access level of a processing thread to computing resources (e.g., memory, processor, or other virtual or physical resources). There may be multiple different privilege levels assigned to the processing threads. In one example, the privilege levels may correspond generally to either a kernel privilege level or a user space privilege level. The user space privilege level may enable a processing thread to access resources assigned to the processing thread but may restrict access to resources assigned to another user space or kernel space processing thread. The kernel space privilege level may enable a processing thread to access resources assigned to other kernel space or user space processing threads. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Kernel 120 may manage processing threads 110A-C and depending on the privilege level may provide or restrict a processing thread from accessing or executing on hardware devices 130. Kernel 120 may be a part of an operating system and may provide hardware virtualization, operating-system virtualization, other virtualization, or a combination thereof. Hardware virtualization may involve the creation of one or more virtual machines that emulate an instance of a physical computing machine. Operating-system-level virtualization may involve the creation of one or more containers that emulate an instance of an operating system. In one example, kernel 120 may include a hypervisor or hypervisor functionality and each of the processing threads 110A-C may execute within a separate virtual machine or container. In another example, kernel 120 may be a part of a non-virtualized operating system that is absent hardware virtualization and operating-system-level virtualization and each of the processing threads 110A-C may be a user space process (e.g., application process) managed by the non-virtualized operating system. In either example, kernel 120 may provide storage virtualization in the form of virtualized data storage 128.

Virtualized data storage 128 may involve any data storage virtualization technology that maps virtualized storage resources (e.g., storage units 129A-Z) to portions of physical data storage 128. Virtualized data storage 128 may be a layer of abstraction provided by kernel 120 that hides the physical locations of data within physical data storage 128. Virtualized data storage 128 may enhance security due to memory isolation and may increase the perceived capacity of data storage resources. The capacity of storage units 129A-Z may exceed the capacity of the underlying physical data storage devices because virtualized data storage 128 may use a combination of multiple different storage devices (e.g., primary storage and auxiliary storage) to make it appear that the primary storage has more capacity then is physically present.

Storage units 129A-Z may be any virtualized unit of data storage for storing, organizing, or accessing data. A storage unit may include a contiguous or non-contiguous sequence of bytes or bits. A storage unit may be a logical representation of underlying physical storage units, which may be referred to as physical storage blocks. Storage units 129A-Z may have a unit size that is the same or different from a physical block size provided by underlying hardware. The block size may be a fixed-size, such as a particular integer value (e.g., 4 KB, 4 MB, 1 GB) or may be a variable-size that varies within any range of integer values. Each of the storage units 129A-Z may have the same block size or a different block size when compared to an adjacent storage unit. In one example, storage units 129A-Z may be a memory segment and each memory segment may correspond to an individual memory page, multiple memory pages, or a portion of a memory page. In other examples, each of the storage units 129A-Z may correspond to a portion (e.g., block, sector) of a mass storage device (e.g., hard disk).

Physical data storage 128 may include one or more physical storage devices that are capable of storing data. Physical data storage 128 may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. Physical data storage 128 may include multiple different storage devices that are organized into layers to provide a caching mechanism. A first layer may be referred to as primary storage and a second layer may be referred to as auxiliary storage (e.g., secondary storage). In one example, the primary storage may include one or more memory devices that function as main memory and the auxiliary storage may include one or more hard disk drives (HDD), solid state drives (SSD), network resources (e.g., Storage Area Network (SAN), Network Attached Storage (NAS)), other local or remote data storage resources, or a combination thereof that may function as a backing store.

Virtualized data storage 128 may be the same or similar to memory virtualization. Memory virtualization may be a memory management technique provided by kernel 120 that maps storage units 129 (e.g., memory pages) to segments of physical data storage 128. The locations of storage units 129A-C may be provided to processing threads 110A-C using one or more virtualized addresses of a virtualized address space shared by multiple processing threads. Each of the storage units 129 may appear as a contiguous segment but may be mapped to non-contiguous segments of physical data storage 128. Kernel 120 may manage mapping the virtualized addresses to physical addresses of physical data storage 128.

The memory virtualization may support one or more page sizes. The virtualized memory may support smaller memory page sizes (e.g., 4 KB) and/or support larger memory pages sizes that are larger than 4 KB (e.g., 2 MB). The larger memory pages may be referred to as huge pages (e.g., Linux®), super pages (Unix®), large pages (Microsoft Windows®), or other term. Support for the larger memory pages may implemented using a non-volatile file system (e.g., traditional file system) or a volatile file system. In one example, a volatile file system include be a Random Access Memory (RAM) based filesystem referred to as "HugeTlbFS" (Huge Translation Lookaside Buffer File System) and one or more of the files of the filesystem may be backed by huge pages and accessed with mmap( ) or read( ) In another example, the volatile file system may include a temporary file system referred to as "TMPFS" (Temporary File System) or "SHMFS" (Shared Memory File System). The temporary file system may appear as a mounted file system even though it is stored in volatile memory instead of persistent storage (e.g., hard drive). The temporary file system may be stored in shared memory (e.g., SHMEM) or non-shared memory without being stored in persistent storage (e.g., except for swap space when applicable).

Kernel 120 may provide virtualized data storage 128 using a combination of components. In the example shown in FIG. 1, kernel 120 may include a hardware event component 122, a translation component 124, and a user space notification component 126.

Hardware event component 122 may be a portion of kernel 120 that interacts with hardware devices 130 and detects a hardware event 134 originating from hardware devices 130. A hardware event 134 may be a fault, an exception, an interrupt, other signal, or a combination thereof that is initiated by hardware devices 130. Hardware event 134 may occur in response to an action of a processing thread and may accompany a halt of the execution of the processing thread. In one example, hardware event 134 may be the same or similar to a page fault that is initiated by a Memory Management Unit (MMU) of a processing device. The page fault may indicate a processing thread attempted to access a storage unit (e.g., memory page) that is available in virtualized data storage 128 but is not physically present in the underlying physical data storage (e.g., main memory).

Hardware event component 122 may enable a processing thread to register as a listener for hardware events corresponding to storage units associated with a different processing thread. This may enable a processing thread to handle a hardware event 134 that is encountered by an unrelated processing thread. Although kernel 120 can handle hardware events for processing threads 110A-C, hardware event component 122 may alternatively enable one of the processing threads to listen to events encountered by one of the other processing threads and to handle the hardware events. In one example, the hardware event may be a page fault encountered by a first processing thread (110A) and a second processing thread may handle the page fault by retrieving data of a storage unit from auxiliary storage (e.g., backing store).

Translation component 124 may enable kernel 120 to translate a virtualized address of an address space shared by multiple processing threads to an offset that is independent of the virtualized address space. Virtualized data storage 128 may implement security enhancements (e.g., randomization) that obfuscate where data is stored. Exposing virtualized addresses of a processing thread to another processing thread may undermine the security enhancements. By translating a virtualized address to an offset, the mechanism can reduce the exposure of the virtualized addresses and avoid adversely affecting existing security enhancements.

User space notification component 126 may enable kernel 120 to notify one or more processing threads that hardware event 134 has been detected. User space notification component 126 may enable kernel 120 to determine whether any processing threads are listening for hardware event 134. User space notification component 126 may then be used to identify the particular listening processing threads and to notify them that hardware event 134 has occurred. The notified processing threads may then interact with hardware devices 130 to handle hardware event 134.

Hardware devices 130 may provide hardware functionality for performing computing tasks. Hardware devices 130 may include one or more processing devices 132A, 132B, one or more data storage devices, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Processing devices 132A and 132B may include one or more processors that are capable of executing the computing tasks discussed above in regards to components 122, 124 and 126. Processing devices 132A and 132B may be a single core processor that is capable of executing one instruction at a time (e.g., single pipeline of instructions) or may be a multi-core processor that simultaneously executes multiple instructions.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
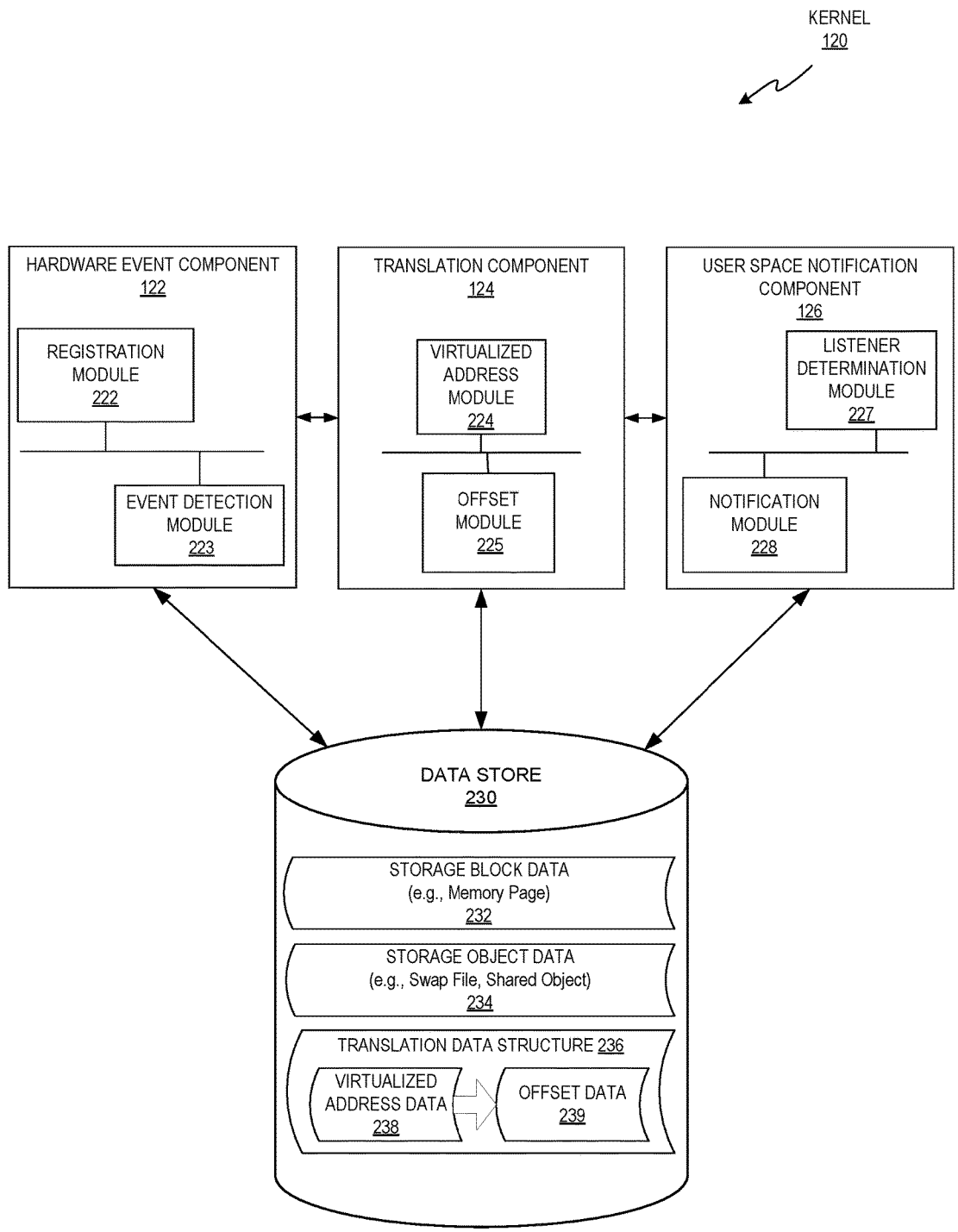
FIG. 2 depicts a block diagram illustrating components and modules of an example kernel, in accordance with one or more aspects of the present disclosure.

FIG. 2 is a block diagram illustrating example components and modules of kernel 120, in accordance with one or more aspects of the present disclosure. In the example shown, kernel 120 may include a hardware event component 122, a translation component 124, a user space notification component 126, and a data store 230. More or less components or modules may be included without loss of generality. For example, two or more of the components may be combined into a single component, or features of a component may be divided into two or more components. In one implementation, one or more of the components may reside on different computing devices (e.g., a client device and a server device).

Hardware event component 122 may include executable code that enables kernel 120 to interact with underlying hardware devices. Hardware event component 122 may include a registration module 222 and an event detection module 223.

Registration module 222 may enable a processing thread to listen to hardware events of another processing thread. The processing threads may both be user space processing threads and a first processing thread may use registration module 222 to register with kernel 120 to listen to hardware events that occur during the execution of a second processing thread. In one example, registration module 222 may provide functionality that is the same or similar to userfaultfd available to linux or unix-like operating systems. Userfaultfd may provide a mechanism that enables a thread to perform user-space paging for other threads that are in the same process or in different processes. A thread may make a system call to an underlying kernel to register as a listener for a storage region accessed by other threads. When a page fault occurs for the storage region, the faulting thread is put to sleep and a hardware event is generated. The fault-handling thread may discover the hardware event using event detection module 223.

Event detection module 223 may detect the occurrence of hardware events for a registered region of storage (e.g., range of storage units). Detecting the hardware event may involve detecting a fault, an exception, an interrupt, other signal, or a combination thereof that is initiated by a hardware device. The hardware event may correspond to a particular storage unit and may identify the storage unit using one or more virtualized addresses. In one example, the hardware event may be a page fault of a first processing thread that is handled by a second processing thread. The page fault may be encountered in response to the first processing thread attempting to access a storage unit in a virtualized address space (e.g., virtual memory) that does not currently reside in physical memory.

Translation component 124 may enable kernel 120 to translate the virtualized address to an offset that is independent of the virtualized address space. Exposing which virtualized addresses correspond to which processing threads may adversely affect existing security enhancement techniques, such as address space layout randomization (ASLR). ASLR may be a security technique that reduces exploitation of memory vulnerabilities by reducing an attacker's ability to reliably jump to a particular function in memory. ALSR may randomly arrange the address space positions of a processing thread's key data areas, such as the starting locations of the executable, stack, heap, libraries, or other portions of the processing thread. In the example shown in FIG. 2, translation component 124 may avoid exposing the virtualized addresses by using a virtualized address module 224 and an offset module 225.

Virtualized address module 224 may interface with the virtualized address space that is shared across multiple processing threads. Virtualized address module 224 may analyze the hardware event, which may include information indicating the virtual address that corresponds to the hardware event. The information may include the one or more virtual addresses or other information that may be used to determine a virtual address.

Offset module 225 may identify the offset in view of the virtual address and storage object data 234. Storage object data 234 may identify the storage object that functions as a backing store for the virtualized data storage. The storage object may be a file object, a shared kernel object, other object, or a combination thereof that stores data of a storage unit. The storage object may be referenced through a file descriptor and may exist on auxiliary storage and function to extend the capacity of the primary storage. The offset may be a displacement value relative to the storage object and may identify a location within the storage object that corresponds to the virtualized address. The offset may be used as a substitute for the virtualized address and may be specific to the processing thread that encountered the hardware event or the processing thread that is listening for the hardware event. The offset may be determined in view of a translation data structure 236, which may include virtualized address data 238 and offset data 239. Translation data structure 236 may map particular virtualized addresses (e.g., virtual addresses) to particular offsets of the storage object.

In one example, the relationship between a storage unit and the storage object may be the same or similar to a memory-mapped file. A memory-mapped file may be a segment of virtual memory (e.g., storage unit) that has been assigned a direct byte-for-byte correlation with a portion of a storage object. The storage object may be a file object that is physically present in auxiliary storage (e.g., present on disk) or it may be a shared memory object, device (e.g., local or remote device), other resource, or a combination thereof that kernel 120 may reference through a file descriptor. The correlation between the file descriptor and the memory space enables processing threads to treat the content in auxiliary storage as if it were in primary storage (e.g., main memory).

User space notification component 126 may enable kernel 120 to notify one or more processing threads that a hardware event has been detected. User space notification component 126 may include a listener determination module 227 and a notification module 228. The listener determination module 227 may enable the kernel to determine whether any processing threads (e.g., user space processes or guest operating system processes) have registered as a listener for a particular region of storage units. If there are registered processing threads, listener determination module 227 may provide identification information for the listening processing threads. The identification information may include any identification information for a processing thread (e.g., process identifier (PID)). Notification module 228 may then enable kernel 120 to transmit a notification of the hardware event to the registered processing thread. In one example, the notification may include the offset and identification information of the storage object. In another example, the notification may include the offset without providing any information about the storage object.

Figure 3:
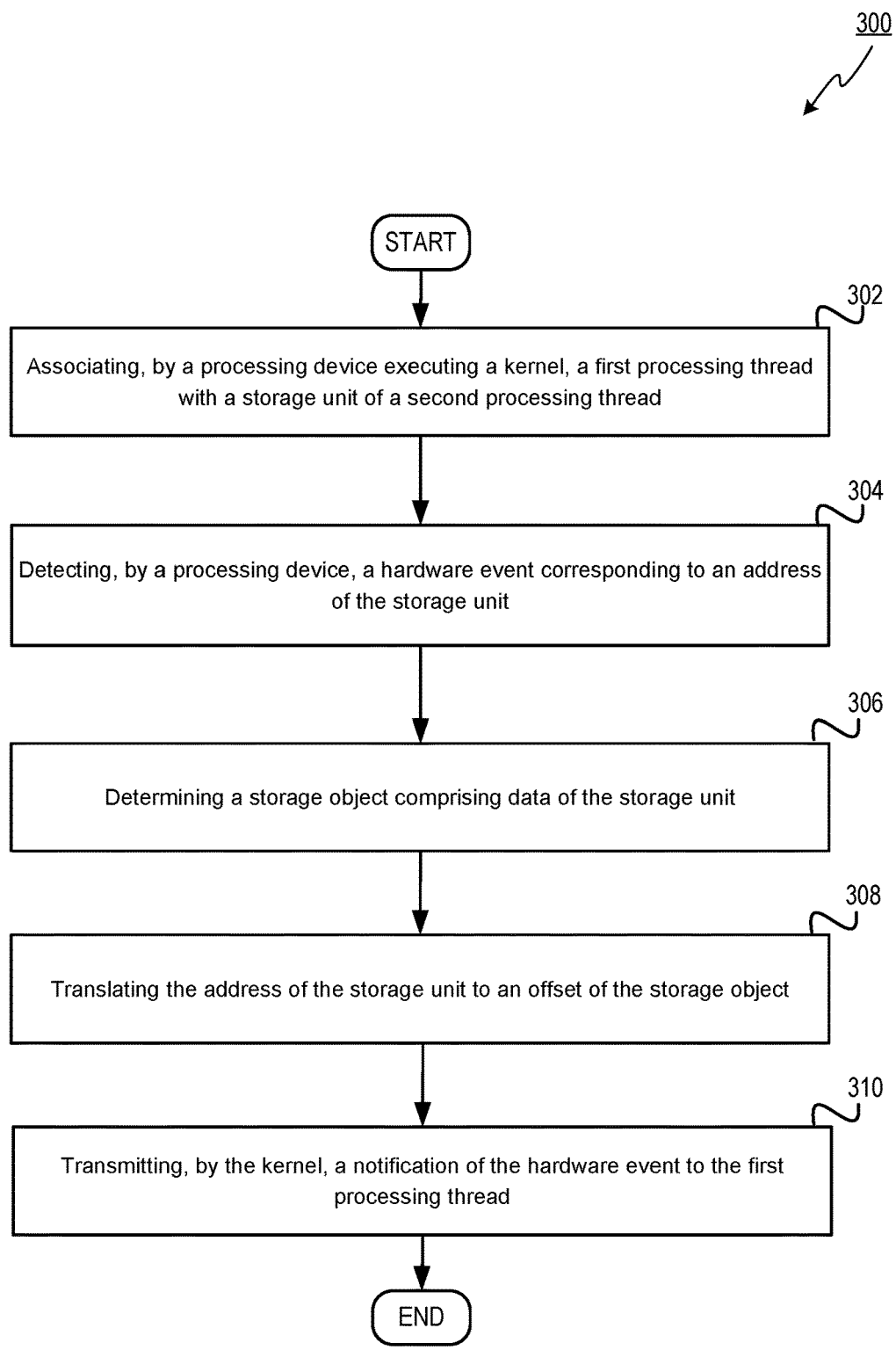
FIG. 3 depicts a flow diagram of an example method for enabling a user space processing thread to handle hardware events encountered by a different processing thread, in accordance with one or more aspects of the present disclosure.

FIG. 3 depicts a flow diagram of an illustrative example of a method 300 for security enhanced sharing of hardware events across processing threads, in accordance with one or more aspects of the present disclosure. Method 300 and each of its individual functions, routines, subroutines, or operations may be performed by one or more processors of the computer device executing the method. In certain implementations, method 300 may be performed by a single processing thread of a kernel. Alternatively, methods 300 may be performed by two or more processing threads, each thread executing one or more individual functions, routines, subroutines, or operations of the method. In an illustrative example, the processing threads implementing methods 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by kernel 120 of FIGS. 1 and 2.

Method 300 may be performed by processing devices of a server device or a client device and may begin at block 302. At block 302, a processing device executing a kernel may associate a first processing thread with a storage unit of a second processing thread. In one example, the first processing thread and the second processing thread may be executed by separate virtual machines that are managed by the same kernel (e.g., hypervisor, host operating system). In another example, the first processing thread and the second processing thread may be separate user space processes managed by the same kernel (e.g., operating system absent hardware virtualization). The processing thread may be either a computer based process or a computer based thread. In one example, the first processing thread and the second processing thread may each comprise a respective thread of a single process. In another example, the first processing thread may comprise a user space thread and the second processing thread may comprise a kernel thread. The user space thread and the kernel thread may be threads executing with user space privileges and kernel space privileges respectively.

Associating the first processing thread with the storage unit of the second processing thread may involve receiving, by the kernel, a request from the first processing thread that comprises identification information of the storage unit of the second processing thread. The identification information may include a particular location of the storage unit or include a range of storage units that include the storage location. The location may include one or more addresses (e.g., virtual or physical), pointers, displacement values (e.g., offsets), other indicators, or a combination thereof. Responsive to the request, the kernel may register the first processing thread to receive notifications of hardware events corresponding to the storage unit. This may be referred to as registering the processing thread as a hardware event listener or as a hardware event handler.

At block 304, the processing device may detect a hardware event corresponding to an address of the storage unit. Detecting the hardware event may involve detecting a fault, an exception, an interrupt, other signal, or a combination thereof that is initiated by a hardware device and may alter an execution of the first processing thread. In one example, the hardware event may comprise a page fault of the second processing thread that is handled by the first processing thread. The page fault may be encountered by the second processing thread in response to the second processing thread attempting to access a memory page in virtual memory that does not currently reside in physical memory.

At block 306, the processing device may determine a storage object comprising data of the storage unit. The storage unit may be assigned to the second processing thread to store data and may be restricted from being accessed by the first processing thread. The storage unit may comprise a memory page of virtual memory and the storage object may comprise a memory-mapped file object. The memory page may be a logical construct that represents data stored in a volatile storage device (e.g., Random Access Memory (RAM)) or non-volatile storage device (e.g., Non-Volatile Random Access Memory (NV-RAM)). The storage object may be a memory-mapped file object but could also or alternatively be a shared memory object stored in shared kernel memory.

At block 308, the processing device may translate the address of the storage unit to an offset of the storage object. Translating the address to an offset may involve translating a virtualized address associated with the memory page to a file offset of the memory-mapped file object using a translation data structure of a virtual memory. The translation data structure may include identification data (e.g., a link) to the storage object.

At block 310, the processing device executing the kernel may transmit a notification of the hardware event to the first processing thread. The notification may include the offset determined in block 308. When the hardware event is a page fault the notification of the page fault may correspond to the storage unit of the second processing thread without providing access to the storage unit of the second processing thread. Responsive to completing the operations described herein above with references to block 310, the method may terminate.

In other examples of method 300, the kernel may further receive a request from the first processing thread to retrieve the data of the storage unit of the second processing thread from an auxiliary storage. The retrieval may function to address, resolve, or handle the hardware event so that the second processing thread can continue executing. The auxiliary storage may function as a backing store or backup storage to a primary storage. The primary storage may be a portion of a memory device (e.g., main memory) and the auxiliary storage may be a separate storage device such as another memory device (e.g., extended memory) or a secondary storage device (e.g., hard disk, solid state storage).

Figure 4:
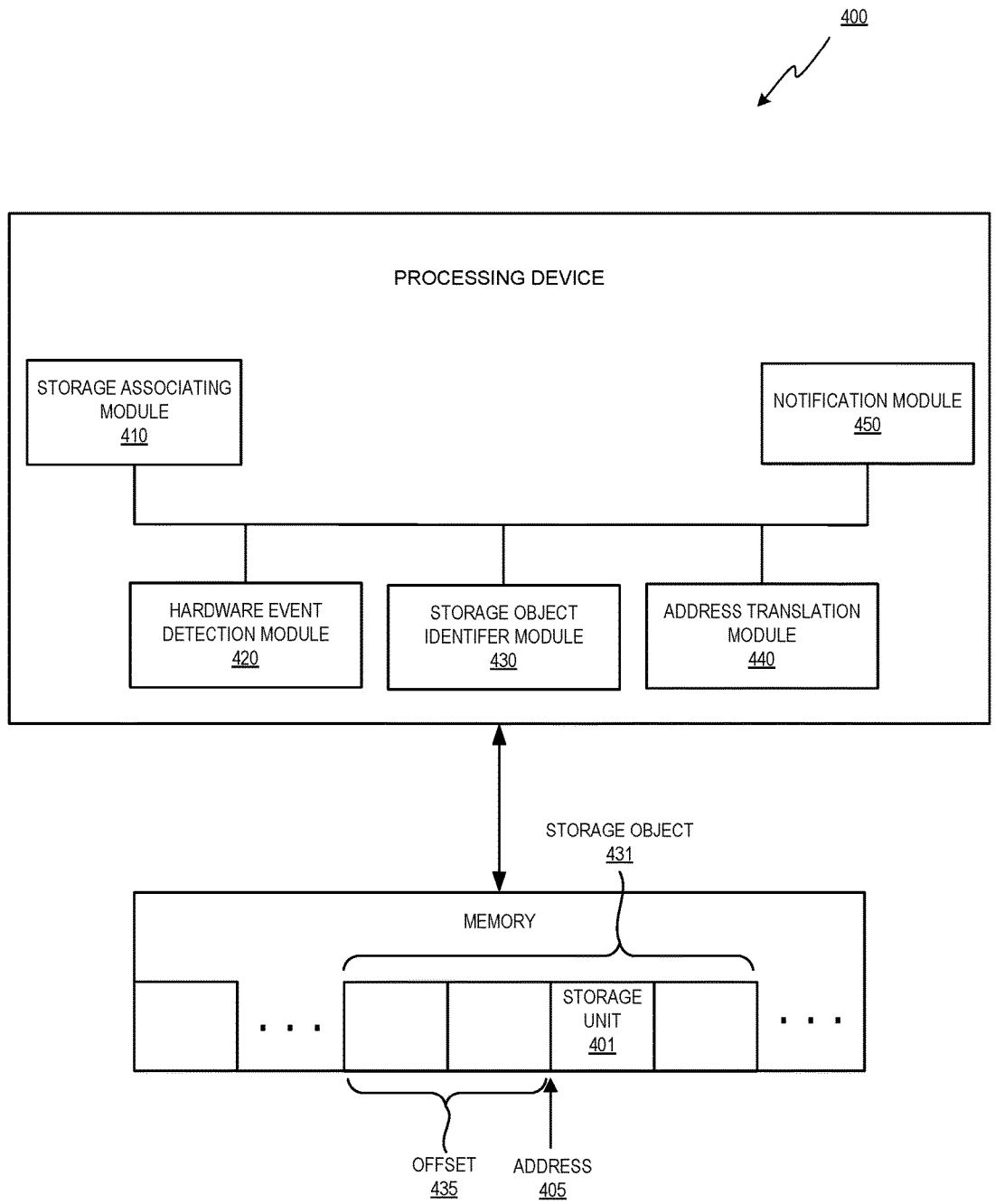
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computing system 100 of FIG. 1 and may include one or more processing devices and one or more memory devices. In the example shown, computer system 400 may include a storage associating module 410, a hardware event detection module 420, a storage object identifier module 430, an address translation module 440, and a notification module 450.

Storage associating module 410 may enable a processing device executing a kernel to associate a first processing thread with a storage unit 401 of a second processing thread. In one example, the first processing thread and the second processing thread may be executed by separate virtual machines that are managed by the same kernel (e.g., hypervisor, host operating system). In another example, the first processing thread and the second processing thread may be separate user space processes managed by the same kernel (e.g., operating system absent hardware virtualization). The processing thread may be either a computer based process or a computer based thread. In one example, the first processing thread and the second processing thread may each comprise a respective thread of a single process. In another example, the first processing thread may comprise a user space thread and the second processing thread may comprise a kernel thread. The user space thread and the kernel thread may be threads executing with user space privileges and kernel space privileges respectively.

Associating the first processing thread with storage unit 401 of the second processing thread may involve receiving, by the kernel, a request from the first processing thread that comprises identification information of storage unit 401 of the second processing thread. The identification information may include a particular location of storage unit 401 or include a range of storage units that include the storage location. The location may include one or more addresses (e.g., virtual or physical addresses), pointers, displacement values (e.g., offsets), other indicators, or a combination thereof. Responsive to the request, the kernel may register the first processing thread to receive notifications of hardware events corresponding to storage unit 401. This may be referred to as registering the processing thread as a hardware event listener or as a hardware event handler.

Hardware event detection module 420 may enable the processing device to detect a hardware event corresponding to an address 405 of storage unit 401. Detecting the hardware event may involve detecting a fault, an exception, an interrupt, other signal, or a combination thereof that is initiated by a hardware device and may alter an execution of the first processing thread. In one example, the hardware event may comprise a page fault of the second processing thread that is handled by the first processing thread. The page fault may be encountered by the second processing thread in response to the second processing thread attempting to access a memory page in virtual memory that does not currently reside in physical memory.

Storage object identifier module 430 may enable the processing device to determine a storage object 431 comprising data of storage unit 401. Storage unit 401 may be assigned to the second processing thread to store data and may be restricted from being accessed by the first processing thread. Storage unit 401 may comprise a memory page of virtual memory and the storage object 431 may comprise a memory-mapped file object. The memory page may be a logical construct that represents data stored in a volatile storage device (e.g., Random Access Memory (RAM)) or non-volatile storage device (e.g., Non-Volatile Random Access Memory (NV-RAM)). Storage object 431 may be a memory-mapped file object but could also or alternatively be a shared memory object stored in shared kernel memory.

Address translation module 440 may enable the processing device to translate address 405 of storage unit 401 to an offset 435 of storage object 431. Translating address 405 to an offset 435 may involve translating a virtualized address associated with the memory page to a file offset of the memory-mapped file object using a translation data structure of a virtual memory. The translation data structure may include identification data (e.g., a link) to storage object 431.

Notification module 450 may enable the processing device executing the kernel to transmit a notification of the hardware event to the first processing thread. The notification may include offset 435 determined by address translation module 440. When the hardware event is a page fault the notification of the page fault may correspond to storage unit 401 of the second processing thread without providing access to storage unit 401 of the second processing thread.

Figure 5:
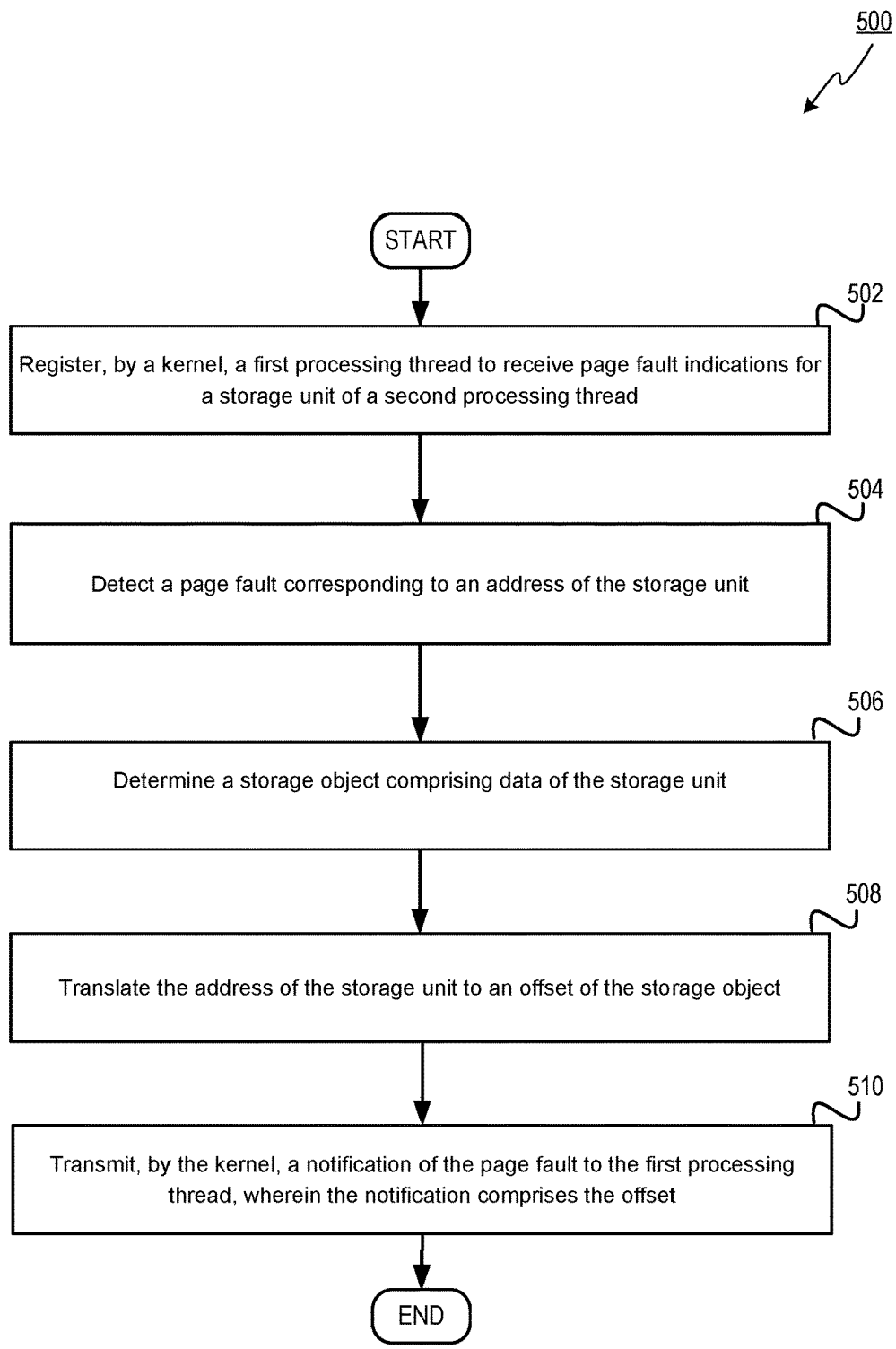
FIG. 5 depicts a flow diagram of an example method for enabling a user space processing thread to register for page faults encountered by a different processing thread, in accordance with one or more aspects of the present disclosure.

FIG. 5 depicts a flow diagram of an illustrative example of a method 500 for security enhanced sharing of page faults across processing threads, in accordance with one or more aspects of the present disclosure. Method 500 may be similar to method 300 and may be performed in the same or a similar manner as described above in regards to FIG. 3. Method 500 may be performed by processing devices of a server device or a client device and may begin at block 502.

At block 502, a processing device executing a kernel may register a first processing thread to receive page fault indications for a storage unit of a second processing thread. In one example, the first processing thread and the second processing thread may be executed by separate virtual machines that are managed by the same kernel (e.g., hypervisor, host operating system). In another example, the first processing thread and the second processing thread may be separate user space processes managed by the same kernel (e.g., operating system absent hardware virtualization). The registration may be in response to receiving, by the kernel, a request from the first processing thread that comprises identification information of the storage unit of the second processing thread. The identification information may include a particular location of the storage unit or include a range of storage units that include the storage location. The location may include one or more addresses (e.g., virtual or physical), pointers, displacement values (e.g., offsets), other indicators, or a combination thereof.

At block 504, the processing device may detect a page fault corresponding to an address of the storage unit. Detecting the page fault may involve detecting an exception, an interrupt, other signal, or a combination thereof that is initiated by a hardware device and may alter an execution of the first processing thread. In one example, the page fault may be initiated by the second processing thread but handled by the first processing thread. The page fault may be encountered by the second processing thread in response to the second processing thread attempting to access a memory page in virtual memory that does not currently reside in physical memory.

At block 506, the processing device may determine a storage object comprising data of the storage unit. The storage unit may be assigned to the second processing thread to store data and may be restricted from being accessed by the first processing thread. The storage unit may comprise a memory page of virtual memory and the storage object may comprise a memory-mapped file object. The memory page may be a logical construct that represents data stored in a volatile storage device (e.g., Random Access Memory (RAM)) or non-volatile storage device (e.g., Non-Volatile Random Access Memory (NV-RAM)). The storage object may be a memory-mapped file object but could also or alternatively be a shared memory object stored in shared kernel memory.

At block 508, the processing device may translate the address of the storage unit to an offset of the storage object. Translating the address to an offset may involve translating a virtualized address associated with the memory page to a file offset of the memory-mapped file object using a translation data structure of a virtual memory. The translation data structure may include identification data (e.g., a link) to the storage object.

At block 510, the processing device executing the kernel may transmit a notification of the page fault to the first processing thread. The notification may include the offset determined in block 508. When the page fault is a page fault the notification of the page fault may correspond to the storage unit of the second processing thread without providing access to the storage unit of the second processing thread. Responsive to completing the operations described herein above with references to block 510, the method may terminate.

Figure 6:
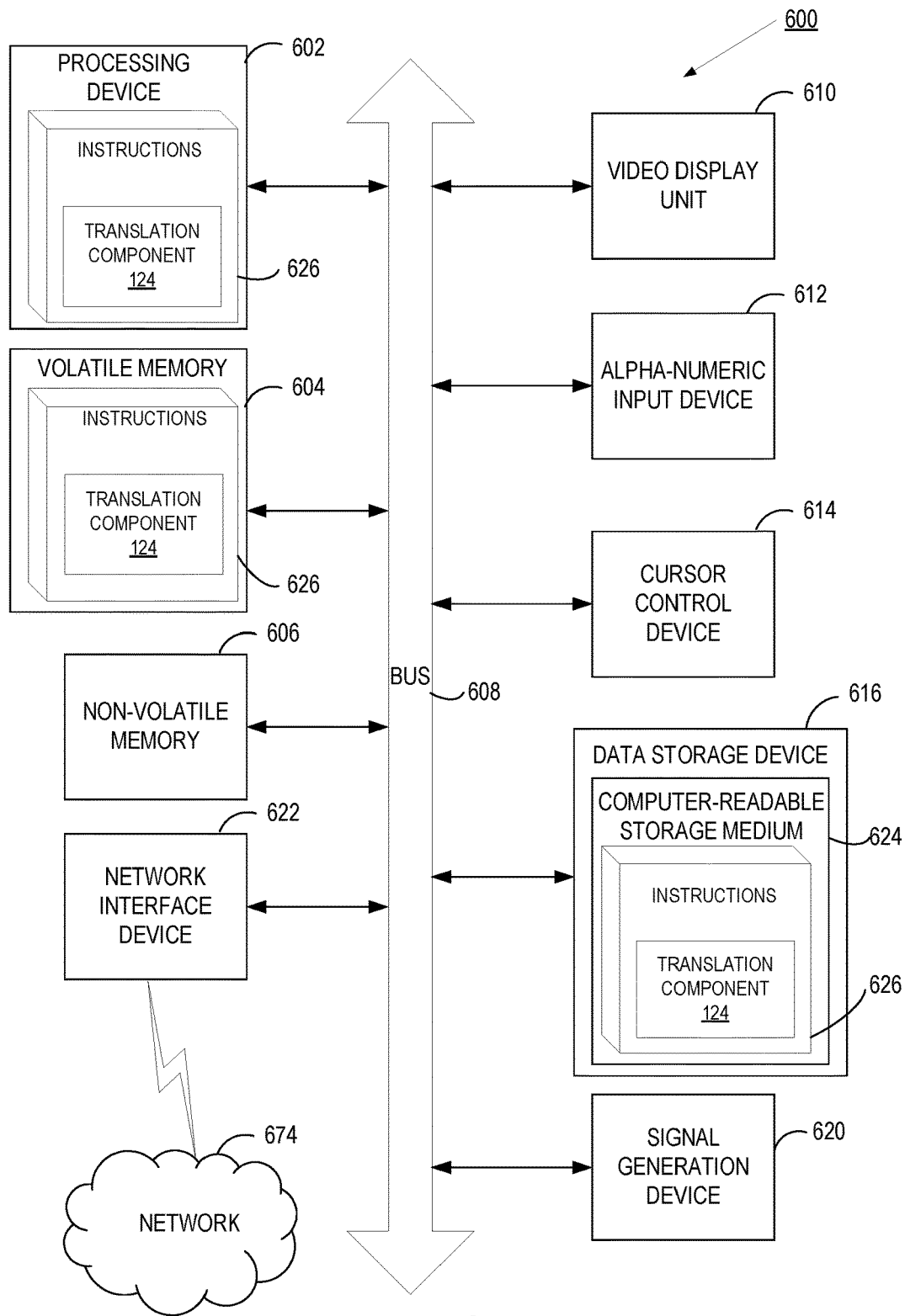
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding translation component 124 of FIGS. 1 and 2.

Instructions 626 may also reside, completely or partially, within volatile memory 604 and/or within processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    associating, by a processing device executing a kernel, a first processing thread with a storage unit of a second processing thread;
    detecting, by a processing device, a hardware event corresponding to an address of the storage unit;
    determining a storage object comprising data of the storage unit;
    translating the address of the storage unit to an offset of the storage object; and
    transmitting, by the kernel, a notification of the hardware event to the first processing thread, wherein the notification comprises the offset.

2. The method of claim 1, wherein associating the first processing thread with the storage unit of the second processing thread comprises:
    receiving, by the kernel, a request from the first processing thread that comprises identification information of the storage unit of the second processing thread; and
    registering, by the kernel, the first processing thread to receive notifications of hardware events corresponding to the storage unit.

3. The method of claim 1, wherein the first processing thread and the second processing thread are separate user space processes managed by the kernel.

4. The method of claim 1, wherein the first processing thread and the second processing thread are executed by separate virtual machines that are managed by the kernel.

5. The method of claim 1, wherein the hardware event comprises a page fault of the second processing thread that is handled by the first processing thread.

6. The method of claim 1, wherein the storage unit comprises a memory page of virtual memory and the storage object comprises a memory-mapped file object of a non-volatile file system.

7. The method of claim 1, wherein the storage unit comprises a memory page of virtual memory and the storage object comprises a memory-mapped file object of a volatile file system.

8. The method of claim 7, wherein translating the address to an offset comprises translating a virtualized address associated with the memory page to a file offset of the memory-mapped file object.

9. The method of claim 1 further comprising, receiving, by the kernel, a request from the first processing thread to retrieve the data of the storage unit of the second processing thread from an auxiliary storage.

10. The method of claim 1, wherein detecting the hardware event comprises detecting a fault, an exception, an interrupt, or a signal that is initiated by a hardware device and alters an execution of the first processing thread.

11. A system comprising:
    a memory;
    a processing device executing a kernel and operatively coupled to the memory, the processing device to:
        associate a first processing thread with a storage unit of a second processing thread;
        detect a hardware event corresponding to an address of the storage unit;
        determine a storage object that comprises data of the storage unit;
        translate the address of the storage unit to an offset of the storage object; and
        transmit, by the kernel, a notification of the hardware event to the first processing thread, wherein the notification comprises the offset.

12. The system of claim 11, wherein associating the first processing thread with the storage unit of the second processing thread comprises:
    receiving, by the kernel, a request from the first processing thread that comprises identification information of the storage unit of the second processing thread; and
    registering, by the kernel, the first processing thread to receive notifications of hardware events corresponding to the storage unit.

13. The system of claim 11, wherein the first processing thread and the second processing thread are separate user space processes managed by the kernel.

14. The system of claim 11, wherein the hardware event comprises a page fault of the second processing thread that is handled by the first processing thread.

15. The system of claim 11, wherein the storage unit comprises a memory page of virtual memory and the storage object comprises a memory-mapped file object.

16. A non-transitory machine-readable storage medium storing instructions that cause a processing device to:
    register, by a kernel, a first processing thread to receive page fault indications for a storage unit of a second processing thread;
    detect a page fault corresponding to an address of the storage unit;
    determine a storage object comprising data of the storage unit;
    translate the address of the storage unit to an offset of the storage object; and
    transmit, by the kernel, a notification of the page fault to the first processing thread, wherein the notification comprises the offset.

17. The non-transitory machine-readable storage medium of claim 16, wherein the first processing thread and the second processing thread are separate user space processes managed by the kernel.

18. The non-transitory machine-readable storage medium of claim 16, wherein the first processing thread and the second processing thread are executed by separate virtual machines that are managed by the kernel.

19. The non-transitory machine-readable storage medium of claim 16, wherein the page fault of the second processing thread is handled by the first processing thread.

20. The non-transitory machine-readable storage medium of claim 16, wherein the storage unit comprises a memory page of virtual memory and the storage object comprises a memory-mapped file object.

\* \* \* \* \*